Patented June 17, 1952

2,600,838

UNITED STATES PATENT OFFICE 2,600,838

THIENYL MERCAPTALS AND MERCAPTOLS

John W. Brooks, Wenonah, N. J., assignor to Socony-Vacuum Oil Company, Incorporated, a corporation of New York No Drawing. Original application November 26, 1947, Serial No. 788,330. Divided and this application November 19, 1948, Serial No. 61,121

6 Claims. (Cl. 260—329)

This invention relates to a group of new chemical compounds, namely, the thienyl mercaptols and thienyl marcaptals. More specifically, the present invention is directed to an improvement of viscous mineral oil fractions by incorporation therein of a small proportion, sufficient to improve the properties thereof, of one or more of the aforesaid compounds.

As is well known to those familiar with the art, substantially all of the numerous fractions obtained from mineral oils and refined for their various uses are susceptible to oxidation. The susceptibility of an oil fraction to oxidation and the manner in which oxidation manifests itself within the oil vary with the type and degree of refinement to which the oil has been subjected and with the conditions under which it is used or tested; that is, the products formed in an oil fraction as a result of oxidation and the degree to which they are formed depend on the extent to which the various unstable constituents, or constituents which may act as oxidation catalysts, have been removed by refining operations and also upon the conditions of use.

The present invention is predicated upon the discovery that a new group of chemical compounds, the thienyl mercaptals and mercaptols, greatly improve the oxidation characteristics of mineral oil fractions by the incorporation therein of minor proportions of these compounds. It has been found that by the addition of a thienyl mercaptal or thienyl mercaptol to a viscous mineral oil fraction, the development of undesirable products and properties, such as acid, sludge, discoloration, and corrosiveness toward alloy-bearing metals normally encountered under conditions of use has been substantially inhibited.

The compounds of this invention may be designated by the general formula:

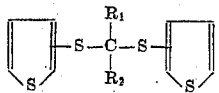

where $R_1$ represents an alkyl, aryl, aralkyl, heterocyclic group or a hydrogen atom and $R_2$ represents an alkyl, aryl, aralkyl, or heterocyclic group. Thus, the above compounds include the thienyl mercaptols and thienyl mercaptals.

The thienyl mercaptols and mercaptals described above may suitably be prepared by the action of an aldehyde or ketone on a thiophenethiol in the presence of anhydrous hydrogen chloride or similar condensation catalyst. Under such conditions, the hydrogen of the mercapto group in the thiophenethiol reacts with oxygen of the carbonyl-containing aldehyde or ketone employed to split out water and to yield the desired thienyl mercaptal or thienyl mercaptol.

In general, the temperature at which the above reaction is carried out will be between about 0° C. and about 100° C. and preferably between about 0° C. and about 30° C. It will be understood that the particular conditions of temperature employed will depend in part on the nature of the aldehyde or ketone reactant used. The thiophenethiol reactant above-mentioned may be prepared by any one of numerous procedures heretofore described in the literature. Thus, 3-thiophenethiol may be produced by the process described in Chem. Inds. 60, 593–5, 620 (1947) and 2-thiophenethiol by the procedure described in Ber. Dtsch. Chem. Ges. 19, 1615 (1886) or in Ber. Dtsch. Chem. Ges. 20, 1756 (1887).

Any of the commonly employed catalysts useful in effecting reaction between a mercaptan and an aldehyde or ketone are contemplated for use in promoting the reaction of thiophenethiol with an aldehyde or ketone. Thus, while the above mentioned anhydrous hydrogen chloride is preferably used as the condensation catalyst herein, various other materials such as calcium chloride, boron trifluoride, zinc chloride, ferric chloride, ammonium chloride, and the like, may be used.

The above described reactions will usually be carried out with a molar ratio of thiophenethiol to aldehyde or ketone of about 2:1 in order to obtain the desired thienyl mercaptal or thienyl mercaptol.

The nature of the alkyl, aryl, aralkyl, or heterocyclic group or groups present in the thienyl mercaptals and mercaptols described herein may be either saturated or unsaturated and may contain various substituents such as those introduced by halogenation, nitration, alkylation, sulfonation, and the like. The alkyl or aralkyl groups may be either straight chained, branch chained, monocyclic or polycyclic, and may contain one or more aromatic groups. Representative of the alkyl, aralkyl, aryl, and heterocyclic thienyl mercaptals and mercaptols of this invention, are those produced upon reacting thiophenethiol with aldehydes, such as acetaldehyde, benzaldehyde, furfural, thiophene aldehyde, crotonaldehyde, cinnamaldehyde, salicylaldehyde, chloral, aldol, acrolein, etc., or those produced upon reacting thiophenethiol with ketones, such as benzophenone, acetone, acetothienone, acetophenone, methyl ethyl ketone, methyl vinyl ketone, diacetone alcohol, etc. This list, of course, is not to be construed as limiting since the present invention contemplates the use of alkyl, aryl, aralkyl, and heterocyclic aldehydes or ketones generally as reactants to synthesize the compounds of this invention. Those skilled in the art will readily recognize various other aldehydes or ketones which may be employed according to the above described procedure in preparing the compounds of this invention.

The thiophenethiol reactant employed in synthesizing the compounds of this invention may be either a 2-thiophenethiol or a 3-thiophenethiol and may contain one or more substituent groups, such as alkyl, alkoxy, halogen, nitro, or acyl groups.

The preparation of the compounds of the present invention may be illustrated by the following examples, which are given by way of illustration and not intended to be a limitation on the scope of the invention.

EXAMPLE I

*Preparation of butyraldehyde, di-3'-thienyl mercaptal*

Two hundred thirty-two grams (2 moles) of 3-thiophenethiol and 72 grams (1 mole) of butyraldehyde were mixed. Upon mixing, the temperature rose to about 75° C. The mixture of reactants was cooled to a temperature of 15° C. by an ice bath, and anhydrous hydrogen chloride was then bubbled into the mixture for a period of 2 hours. At the end of this time, the addition of hydrogen chloride was stopped and the reaction mixture was cooled overnight. The reaction product so obtained was then poured into ice water, washed with water, dried over anhydrous magnesium sulfate and distilled under reduced pressure. One hundred sixty-five grams (58 per cent yield) of butyraldehyde, di-3-thienyl mercaptal were distilled from the reaction mixture at a temperature of 173–176° C. under 2 millimeters pressure. The sulfur analysis of this compound was 44.47 per cent, the theoretical sulfur content being 44.76 per cent. This compound is hereinafter referred to as compound I.

EXAMPLE II

*Preparation of acetone, di-3'-thienyl mercaptol*

Two hundred thirty-two grams (2 moles) of 3-thiophenethiol and 58 grams (1 mole) of acetone were mixed. Anhydrous hydrogen chloride was passed into the mixture of reactants maintained at a temperature of 10° C. until the mixture was saturated with hydrogen chloride. The resulting mixture was cooled overnight and then washed with cold water, dried over anhydrous magnesium sulfate, and distilled under reduced pressure. Two hundred thirty-three grams (84 per cent yield) of acetone, di-3-thienyl mercaptol were distilled from the reaction mixture at a temperature of 148–153° C. under one millimeter pressure. The sulfur analysis of this compound was 46.9 per cent, the theoretical sulfur content being 47.06 per cent. This compound is hereinafter referred to as compound II.

EXAMPLE III

*Preparation of benzaldehyde, di-3'-thienyl mercaptal*

Three hundred forty-eight grams (3 moles) of 3-thiophenethiol were added to 159 grams (1.5 moles) of benzaldehyde. The mixture was cooled in an ice bath to a temperature of 15° C. Anhydrous hydrogen chloride was then bubbled into the mixture at a temperature of 10° C. for a period of 2 hours. At the end of this time, the addition of hydrogen chloride was stopped and the reaction mixture was cooled overnight. The reaction product so obtained was washed well with ice water to remove hydrogen chloride, dried over anhydrous magnesium sulfate and topped to a temperature of 100° C. under a pressure of one millimeter. Three hundred fifty-two grams (73 per cent yield) of benzaldehyde, di-3-thienyl mercaptal were obtained as a residue. The sulfur analysis of this compound was 39.05 per cent, the theoretical sulfur content being 40.0 per cent. This compound is hereinafter referred to as compound III.

EXAMPLE IV

*Preparation of benzophenone, di-3'-thienyl mercaptol*

Three hundred sixty-five grams (2 moles) of benzophenone and 400 cc. of xylene were mixed and cooled to a temperature of 10° C. Four hundred sixty-four grams (4 moles) of 3-thiophenethiol were added to the mixture. Anhydrous hydrogen chloride was then passed through the resulting mixture for a period of 2 hours. The reaction mixture was thereafter maintained in a cool place overnight. Six hundred thirty grams (80 per cent yield) of benzophenone, di-3-thienyl mercaptol were formed as a solid. This material was re-crystallized several times from cyclohexane to yield white crystals having a melting point of 152° C. The sulfur analysis of this compound was 32.16 per cent, the theoretical sulfur content being 32.35 per cent. This compound is hereinafter referred to as compound IV.

EXAMPLE V

*Preparation of hydrocinnamaldehyde, di-3'-thienyl mercaptal*

Sixty-seven grams (½ mole) of hydrocinnamaldehyde and 300 cc. of toluene were mixed and the mixture was cooled to a temperature of 10° C. One hundred forty-five grams (1¼ moles) of 3-thiophenethiol were added to the cooled solution. Anhydrous hydrogen chloride was then bubbled into the resulting mixture for a period of 2 hours. At the end of this time, the addition of hydrogen chloride was stopped and the reaction mixture was cooled overnight. The reaction product was washed well with water to remove hydrogen chloride, dried over anhydrous calcium sulfate and topped to a temperature of 100° C. under a pressure of one millimeter. One hundred twenty-one grams (69.5 per cent yield) of hydrocinnamaldehyde, di-3-thienyl mercaptal were obtained as a residue. The sulfur analysis of this compound was 34.96 per cent, the theoretical sulfur content being 36.78 per cent. This compound is hereinafter referred to as compound V.

EXAMPLE VI

Preparation of furfuraldehyde, di-3'-thienyl mercaptal

Two hundred thirty-two grams (2 moles) of 3-thiophenethiol and 76 grams (1 mole) of furfuraldehyde were placed in a flask maintained at a temperature of 8° C. Anhydrous hydrogen chloride was bubbled into this mixture for a period of 35 minutes. The reaction product resulting was washed with ice water, dried over anhydrous magnesium sulfate and topped to a temperature of 100° C. under a pressure of one millimeter. Furfuraldehyde, di-3-thienyl mercaptal was obtained as a residue in 80 per cent yield. The sulfur analysis of this compound was 41.3 per cent, the theoretical sulfur content being 41.3 per cent. This compound is hereinafter referred to as compound VI.

EXAMPLE VII

Preparation of acetothienone, di-3'-thienyl mercaptol

Three hundred seventy-eight grams (3 moles) of acetothienone and 696 grams (6 moles) of 3-thiophenethiol were placed in a flask maintained at a temperature of 10° C. Anhydrous hydrogen chloride was bubbled into the mixture for a period of 2 hours and the flask was thereafter placed in a refrigerator overnight. Eight hundred forty-nine grams (79 per cent yield) of acetothienone, di-3-thienyl mercaptol were obtained as a solid in the flask. This product was recrystallized from cyclohexane several times to yield crystals having a melting point of 85-86° C. The sulfur analysis of this compound was 47.05 per cent, the theoretical sulfur content being 47.06 per cent. This compound is hereinafter referred to as compound VII.

The dithienyl mercaptals and mercaptols of this invention are contemplated for use as intermediates in the preparation of pharmaceuticals, insecticides, and in the synthesis of other chemical compounds. They have been found to be particularly valuable, however, as additives in the stabilization of petroleum oil fractions in inhibiting the development of those undesirable products and properties, such as acid, sludge, discoloration, and corrosiveness, toward alloy-bearing metals normally encountered under conditions of use. Thus, it is well known that motor oils, especially those refined by certain solvent extraction methods, tend to oxidize when submitted to high temperatures and to form products that are corrosive to metal bearings. This corrosive action may be quite severe with certain bearings, such as those having the corrosion susceptibility of cadmium-silver alloys, and may cause their failure within a comparatively short time. The following test was used to determine the corrosive action of a motor oil on an automobile rod bearing.

The oil used consisted of Pennsylvania neutral and residuum stocks separately refined by means of chlorex and then blended to give an S. A. E. 20 motor oil with a specific gravity of 0.872, a flash point of 435° F. and a Saybolt Universal viscosity of about 318 seconds at 100° F. The oil was tested by adding about a 6-gram section of a bearing containing a cadmium-silver alloy surface and heating it to 175° C. for 22 hours while a stream of air was bubbled against the surface of the bearing. The loss in weight of the bearing during this treatment measures the amount of corrosion that has taken place. A sample of the oil containing a stabilizing compound of this invention was run at the same time as a sample of the straight oil and the loss in weight of the bearing section in the inhibited oil can thus be compared directly with the loss in the uninhibited oil. The results obtained in this test employing minor proportions of the above described compounds as inhibitors are set forth in the following table:

| Compound Added | Concentration in Per Cent | Mg. Loss in Weight |
|---|---|---|
| None | 0 | 20 |
| I | 1.0 | 0 |
| II | 0.5 | 0 |
| III | 0.12 | 6 |
| IV | 0.12 | 0 |
| V | 0.12 | 0 |
| VI | 0.12 | 9 |
| VII | 0.12 | 0 |

A second test, to which an oil containing a minor proportion of the compounds of this invention was subjected, consisted essentially of passing oxygen through a sample of a highly refined oil which had been prepared by treating a petroleum distillate with 40 pounds of 98 per cent sulfuric acid and 180 pounds of 103 per cent oleum per barrel of distillate, followed by a clay percolation. The oil so treated had a specific gravity of 0.871, a flash point of 310° F. and a viscosity (S. U. V.) of 69 seconds at 100° F. Oxygen was bubbled through a 150-gram sample of the above oil at a rate of 2 liters per hour for a period of 70 hours, at a temperature of 120° C. The neutralization number of the oil was measured at the end of the test by titration with alcoholic potash. In this test, the base oil containing no additive developed a neutralization number of about 18. The following data indicate that the compounds of this invention are effective in inhibiting the development of acidity in a mineral oil when the same is subjected to oxidation conditions, as evidenced by the comparatively low neutralization number of such oils at the completion of the above test. In each of the oils tested, 0.1 per cent by weight of a compound of this invention was incorporated therein.

| Compound Added | Neutralization Number |
|---|---|
| None | 18 |
| I | 0.04 |
| II | 0.04 |
| III | 0.04 |
| IV | 0.06 |
| V | 0.24 |
| VI | 0.04 |
| VII | 0.07 |

From the foregoing test results, it will be evident that thienyl mercaptals and mercaptols of this invention are effective stabilizing agents for petroleum lubricating oil fractions. The quantity of compound employed as stabilizer to inhibit the undesirable effects of oxidation in the oil may be varied, depending upon the character of the oil and the severity of the conditions to which it is exposed. Ordinarily, the compositions will be added to mineral oil fractions in an amount ranging from about 0.1 per cent to about 5 per cent, but may be added in amounts up to 10 percent by weight in some instances. An additional illustration of the effectiveness of the above stated minor proportions of thienyl mercaptals and mercaptols in inhibiting the tendency of oils to corrode metal bearings is shown by the following comparative test results in which a blank oil and an oil containing minor proportions of the compounds of this invention were subjected to a Lauson engine test. In this test, a single cylinder Lauson engine was run at a speed of 1825 R. P. M. with an oil temperature of 270° F. and a jacket temperature of 212° F. The oil used was an SAE 20 motor oil having a kinematic viscosity of 8.6 at 210° F. The neutralization number and the percentage viscosity increase of the oil and oil blends and the extent of corrosion as measured by the loss in weight of the copper-lead bearings were determined after 100 hours. The results are set forth in the table below:

| Compound Added | Per Cent Conc. | Results at end of 100 hours | | |
|---|---|---|---|---|
| | | Bearing wt.[1] loss (g.) | Per Cent Vis. Increase | N. N. |
| None | | 0.500 | 38 | 4.7 |
| Acetone, di-3-thienyl mercaptol | 1 | 0.176 | 25 | 3.4 |
| Butyraldehyde, di-3-thienyl mercaptol | 1 | 0.095 | 36 | 3.8 |
| Benzophenone, di-3-thienyl mercaptol | 0.5 | 0.166 | 21 | 3.0 |

[1] Average weight loss of top and bottom ½ bearings.

It will be observed from the foregoing examples and the results set forth that the thienyl mercaptals and mercaptols of this invention are uniformly effective in inhibiting the deleterious effects of oxidation on viscous mineral oil fractions which have been subjected to the various methods of refining treatment currently used. In other words, these compounds are effective as inhibitors in highly refined oils, moderately refined oils, and solvent refined oils.

It is to be understood that the examples, procedures and oil compositions described above are illustrative only and are not to be construed as limiting the scope of this invention thereto. Thus, in addition to the specific compounds set forth, other thienyl mercaptals or mercaptols falling within the scope of the above disclosed general formula may similarly be employed as additives in improving the properties of viscous mineral oil fractions normally subject to deterioration under oxidizing conditions.

This application is a division of co-pending application Serial No. 788,330, filed November 26, 1947, now U. S. 2,480,831 issued September 6, 1949.

I claim:

1. As a new composition of matter, the compound having the general formula:

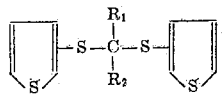

where $R_1$ is a substituent selected from the group consisting of hydrogen and a methyl group; and $R_2$ is a substituent selected from the group consisting of methyl, propyl, phenyl, phenethyl, furyl, and thienyl groups.

2. As a new composition of matter, butyraldehyde, di-3-thienyl mercaptal.

3. As a new composition of matter, acetone, di-3-thienyl mercaptol.

4. As a new composition of matter, benzaldehyde, di-3-thienyl mercaptal.

5. As a new composition of matter, benzophenone, di-3-thienyl mercaptol.

6. As a new composition of matter, acetothienone, di-3-thienyl mercaptol.

JOHN W. BROOKS.

REFERENCES CITED

The following references are of record in the file of this patent:

UNITED STATES PATENTS

| Number | Name | Date |
|---|---|---|
| 2,229,665 | Mochel | Jan. 28, 1941 |
| 2,480,831 | Brooks | Sept. 6, 1949 |

OTHER REFERENCES

Whitmore: "Organic Chemistry," p. 893, Von Nostrand, N. Y., 1937.

Richter: "Organic Chemistry," pp. 649–650, Wiley, N. Y., 1938.